(12) United States Patent
Bhandar et al.

(10) Patent No.: US 8,612,931 B2
(45) Date of Patent: Dec. 17, 2013

(54) INTERACTIVE BLUEPRINTING FOR PACKAGED APPLICATIONS

(75) Inventors: Manisha D. Bhandar, Yorktown Heights, NY (US); Richard T. Goodwin, Dobbs Ferry, NY (US); Anca A. Ivan, San Jose, CA (US); Juhnyoung Lee, Yorktown Heights, NY (US); Pietro Mazzoleni, New York, NY (US); Rakesh Mohan, Cortlandt Manor, NY (US); Aubrey J. Rembert, Hawthorne, NY (US); Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 12/835,872

(22) Filed: Jul. 14, 2010

(65) Prior Publication Data
US 2012/0016653 A1    Jan. 19, 2012

(51) Int. Cl.
*G06F 9/44* (2006.01)
(52) U.S. Cl.
USPC ............................ 717/106; 717/108; 717/113
(58) Field of Classification Search
None
See application file for complete search history.

(56) References Cited

U.S. PATENT DOCUMENTS

| | | |
|---|---|---|
| 4,371,075 A | 2/1983 | Erlichman |
| 5,041,396 A | 8/1991 | Valero |
| 5,343,527 A | 8/1994 | Moore |
| 5,428,619 A | 6/1995 | Schwartz et al. |
| 5,487,141 A | 1/1996 | Cain et al. |
| 5,566,330 A | 10/1996 | Sheffield |
| 5,652,835 A | 7/1997 | Miller |
| 5,724,589 A | 3/1998 | Wold |
| 5,737,727 A | 4/1998 | Lehmann et al. |
| 5,880,675 A | 3/1999 | Trautner |
| 5,884,079 A | 3/1999 | Furusawa |
| 5,956,708 A | 9/1999 | Dyko et al. |
| 5,965,858 A | 10/1999 | Suzuki et al. |
| 5,987,443 A | 11/1999 | Nichols et al. |
| 6,018,731 A | 1/2000 | Bertrand et al. |
| 6,256,773 B1 | 7/2001 | Bowman-Amuah |
| 6,305,548 B1 | 10/2001 | Sato et al. |
| 6,311,316 B1 | 10/2001 | Huggins et al. |
| 6,427,230 B1 | 7/2002 | Goiffon et al. |

(Continued)

OTHER PUBLICATIONS

Dellby et al., Optimized Quadrupole-Octupole C3/C5 Aberration Corrector for STEM, Proceedings of the Seventh International Conference on Charged Particle Optics, Physics Procedia, 2008, 179-183, 1.

(Continued)

*Primary Examiner* — Isaac Tecklu
(74) *Attorney, Agent, or Firm* — Scully, Scott, Murphy & Presser, P.C.; William Stock, Esq.

(57) ABSTRACT

An interactive design of process model for packaged application software installation and configuration generates a process model from a natural language description of software installation or configuration related operation. A data structure representing one or more work products related to the process model is identified, and one or more elements of the data structure are identified that are related to one or more sub-processes of the process model. Input information associated with said one or more sub-processes is captured and stored. The input information is linked with the one or more elements of the data structure related to said one or more sub-processes. The one or more sub-processes in the process model may be also demonstrated through a simulation.

15 Claims, 6 Drawing Sheets

(56) References Cited

U.S. PATENT DOCUMENTS

| | | | |
|---|---|---|---|
| 6,606,740 B1 | 8/2003 | Lynn et al. | |
| 6,718,535 B1* | 4/2004 | Underwood | 717/101 |
| 6,736,903 B2 | 5/2004 | Minazzoli | |
| 6,738,156 B1 | 5/2004 | Simpson et al. | |
| 6,836,841 B1 | 12/2004 | Wu et al. | |
| 6,851,104 B1 | 2/2005 | da Silva | |
| 6,904,449 B1 | 6/2005 | Quinones | |
| 6,907,546 B1 | 6/2005 | Haswell et al. | |
| 6,959,268 B1 | 10/2005 | Myers et al. | |
| 6,961,918 B2 | 11/2005 | Garner et al. | |
| 7,073,164 B1* | 7/2006 | Knowles | 717/102 |
| 7,512,942 B2 | 3/2009 | Brown et al. | |
| 7,590,980 B1* | 9/2009 | Clubb et al. | 717/163 |
| 7,711,670 B2* | 5/2010 | Roediger | 706/46 |
| 7,770,151 B2* | 8/2010 | Sanjar et al. | 717/109 |
| 7,797,678 B2* | 9/2010 | Moulckers et al. | 717/121 |
| 7,890,924 B2* | 2/2011 | Raffo | 717/105 |
| 7,895,568 B1* | 2/2011 | Goodwin et al. | 717/108 |
| 8,010,777 B2* | 8/2011 | Nandan et al. | 713/100 |
| 2002/0069137 A1 | 6/2002 | Hiroshige et al. | |
| 2002/0194053 A1* | 12/2002 | Barrett et al. | 705/10 |
| 2003/0097286 A1* | 5/2003 | Skeen | 705/7 |
| 2003/0145006 A1 | 7/2003 | Dalfsen et al. | |
| 2004/0103396 A1* | 5/2004 | Nehab | 717/127 |
| 2004/0181781 A1* | 9/2004 | Tohdo et al. | 717/124 |
| 2004/0221256 A1* | 11/2004 | Martin et al. | 717/101 |
| 2004/0221260 A1* | 11/2004 | Martin et al. | 717/104 |
| 2005/0114829 A1* | 5/2005 | Robin et al. | 717/101 |
| 2005/0131941 A1 | 6/2005 | Dettinger et al. | |
| 2005/0149343 A1 | 7/2005 | Rhoads | |
| 2005/0216890 A1 | 9/2005 | Sundararajan et al. | |
| 2006/0037000 A1* | 2/2006 | Speeter et al. | 717/120 |
| 2006/0101393 A1 | 5/2006 | Gerken et al. | |
| 2006/0106626 A1 | 5/2006 | Jeng et al. | |
| 2006/0161895 A1* | 7/2006 | Speeter et al. | 717/121 |
| 2007/0002751 A1* | 1/2007 | Wullert et al. | 370/241 |
| 2007/0005539 A1 | 1/2007 | Bergman et al. | |
| 2007/0060113 A1 | 3/2007 | Bonnette et al. | |
| 2007/0089089 A1 | 4/2007 | Kelly et al. | |
| 2007/0168931 A1* | 7/2007 | Martin et al. | 717/104 |
| 2007/0226681 A1 | 9/2007 | Thorup | |
| 2007/0276714 A1 | 11/2007 | Beringer | |
| 2007/0282692 A1 | 12/2007 | Bishop et al. | |
| 2007/0288222 A1 | 12/2007 | Eilam et al. | |
| 2008/0189679 A1* | 8/2008 | Rodriguez et al. | 717/105 |
| 2008/0313595 A1* | 12/2008 | Boulineau et al. | 717/101 |
| 2008/0313596 A1* | 12/2008 | Kreamer et al. | 717/101 |
| 2010/0017792 A1* | 1/2010 | Young et al. | 717/162 |
| 2010/0023920 A1* | 1/2010 | Chaar et al. | 717/102 |
| 2010/0106546 A1* | 4/2010 | Sproule | 705/7 |
| 2011/0083120 A1* | 4/2011 | Bhandar et al. | 717/121 |
| 2011/0099470 A1* | 4/2011 | Ananthanarayanan et al. | 715/255 |

OTHER PUBLICATIONS

Frakes et al., Software Reuse and Reusability Metrics and Models, 1996, pp, 1-32.

Davis et al., Dialogue Specified Reuse of Domain Engineering Work Products, 1994, pp. 28-36.

Glushko, Patterns and Reuse in Document Engineering, 2002, pp. 1-13, file:///C:\Documents%20and%20Settings\glushko\My%20Documents\xml%20conference.

Boukottaya et al., Document Reuse Tool for Communities of Practice, E. Tomadaki and P. Scott (Eds.): Innovative Approaches for Learning and Knowledge Sharing, EC-TEL 2006 Workshops Proceedings, ISSN 1613-0073, p. 235-244, 2006.

Daneva, Six Degrees of Success or Failure in ERP Requirements Engineering: Experiences with the ASAP Process, TELUS Mobility, 200 Consilium Place, Suite 1600, Toronto, Ontario M1H 3J3, Canada.

Salines, An Experience of Reuse Based Requirements Engineering in ERP Implementation Projects, Proceedings of the 11th IEEE International Enterprise Distributed Object Computing Conference, 2007.

Daneva, Measuring reuse of SAP requirements: a model-based approach, Symposium on Software Reusability, Proceedings of the 1999 symposium on Software reusability, 1999, Los Angeles, California US.

Woods, Model-Driven Packaged Applications: Using SOA and BPM to Modernize Packaged Applications, Gartner Research Report, Aug. 5, 2008, ID No. G00159660.

CoScripter, http://coscripter.research.ibm.com/coscripter/browse/.

iMacros, http://wiki.imacros.net/Main_Page.

Selenium, http://seleniumhq.org/.

Business process modeling, http://en.wikipedia.org/wiki/Business_process_modeling.

Architecture of Integrated Information Systems (ARIS), http://en.wikipedia.org/wiki/Architecture_of_integrated_information_Systems.

Lombardi Business Process Management Software, http://www.lombardisoftware.com/.

* cited by examiner

INTERACTIVE BLUEPRINTING FOR PACKAGED APPLICATIONS

FIELD

The present disclosure relates to computer systems and information technology (IT), and more particularly to a tool and method for facilitating a blueprinting phase of packaged software application deployment/installation practices.

BACKGROUND

In packaged application practices, generic software applications provided by third party vendors, for example, International Business Machines, Oracle and SAP are customized to meet individual customer site's information technology (IT) needs. Such practice method may initially include the process of blueprinting, i.e., a design phase that determines the differences between the generic software and what is needed for the particular customer, and may also involve modifying the generic software to meet the needs of that customer. Currently, such practices are performed manually by the individuals involved in the project by traditional methods such as talking to other team members, emailing, and other such communication methods to discover the specific needs of a particular site or customer and determine what documents of the generic software need to be modified. That is, there are no known tools that would facilitate automation of blueprinting.

BRIEF SUMMARY

A method and system for interactive design of process models for packaged application software installation and configuration are provided. The method, in one aspect, may include generating a process model from a natural language description of software installation or configuration related operation. The method may also include identifying a data structure representing one or more work products related to the process model, and identifying one or more elements of the data structure related to one or more sub-processes of the process model. The method may further include capturing input information associated with said one or more sub-processes, and storing the input information and linking the stored input information with said one or more elements of the data structure that correspond to said one or more sub-processes. The method may also include demonstrating said one or more sub-processes in the process model through simulation.

A system for interactive design of process model for packaged application software installation and configuration, in one aspect, may include a process design engine operable to generate a process model from natural language description of software installation or configuration related operation, the process model including one or more sub-processes of the work operation, and store the process model diagram in a process repository. A user interface module may be operable to display the process model diagram including one or more sub-processes of the process model diagram, the user interface module further operable to enable a user to annotate the one or more sub-processes with information. An analysis engine may be operable to analyze information annotated via the user interface and store the information in an information repository, the information being linked to one or more elements of a data structure, the data structure representing a work product related to the process model diagram, and the one or more elements representing the one or more sub-processes. A simulation server may be operable to simulate one or more processes in the process model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure, in one aspect, provides interactive blueprinting for packaged applications, in which needed customization of various generic work products provided by the third party software vendors are identified and performed. A tool and method for interactive blueprinting in the present disclosure may utilize explicit definition of a model associated with various work product types involved in the design phase of a packaged application project. Work product types may include, for example, documents specifying requirements and installation steps for deploying a software project on a computer system. A model in the present disclosure is related to one or more of work products in an IT consulting service project. It is a representation of work products interpretable and executable by computers or machines. It may contain machine-readable representation of every piece of work products (e.g., title, sections such as process description, requirements, gaps, risks, notes, etc.) as objects and their attributes. In addition, a model records linking and relationships of different pieces, objects, and attributes. It is often written in markup languages such as Extensible Markup Language (XML). Note the distinction between the model as a template and instances (instantiation of model w/ actual data values). A model may be used to build tools like IBM Consultant Assistant™ from International Business Machines Corp. of Armonk, N.Y., which is used to process (create, edit, store, retrieve, print, etc.) work products for the project, and also generate reports as claimed in this application. "Model-based" refers to the use of such model of work products. For example, model-based tool or software may be a tool or software built on top of the model of work products. The tool can be used to process (create, edit, store, retrieve, print, etc.) work products and reports. An example of such a tool is IBM Consultant Assistant™. In the present disclosure, the blueprinting tool and/or method may augment such model-based tool.

The interactive blueprinting of the present disclosure in another aspect uses model-based approaches to collect and store real-time information on project documentation. Model-based information is stored in a structured manner for easy retrieval and use by different computer modules or components. Model-based information and creation and use of such information are described in detail in co-owned U.S. patent application Ser. No. 12/575,163 entitled MODELING AND LINKING DOCUMENTS FOR PACKAGED SOFTWARE APPLICATION CONFIGURATION, which disclosure is incorporated herein in its entirety by reference thereto.

Figure 1:
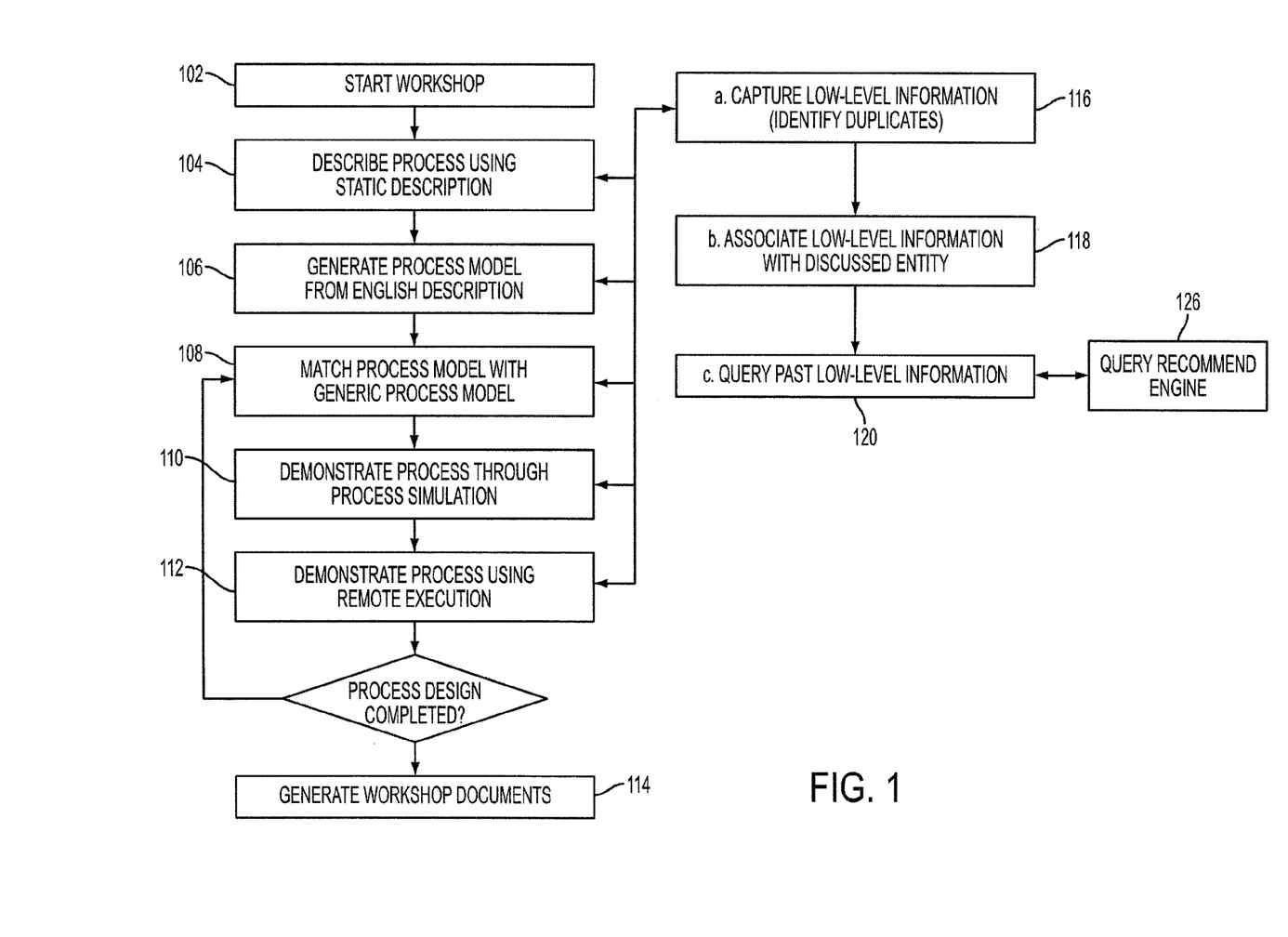
FIG. 1 is a flow diagram illustrating an interactive blueprinting method in one embodiment of the present disclosure.

FIG. 1 is a flow diagram illustrating an interactive blueprinting method in one embodiment of the present disclosure. Blueprinting may be for a particular operation supported by enterprise packaged application software such as an SAP™ packaged application. At 102, blueprinting is started. For instance, individuals involved in the blueprinting come together to conduct a communication session (e.g., in person, telephone or other remote discussion), in which a work procedure or process for a project is described and discussed. Such individuals may include but are not limited to IT consultants, customer personnel, managers or other people related to the project. At 104, the individual or sub-processes or steps involved in the project are identified, that is, for example, during the communication session among the above persons. An example of a work project may be a hiring operation of a human resource department in an enterprise. The process or steps in the operation for the particular customer may include 1) advertising the open position, 2) receiving resumes, 3) evaluating the resumes, 4) selecting candidates, 5) interviewing the candidates, and 6) acquiring upper management's approval, and 6) offering the position. The identified processes or steps may be recorded in plain natural language text, for example, in English text.

Figure 3A:
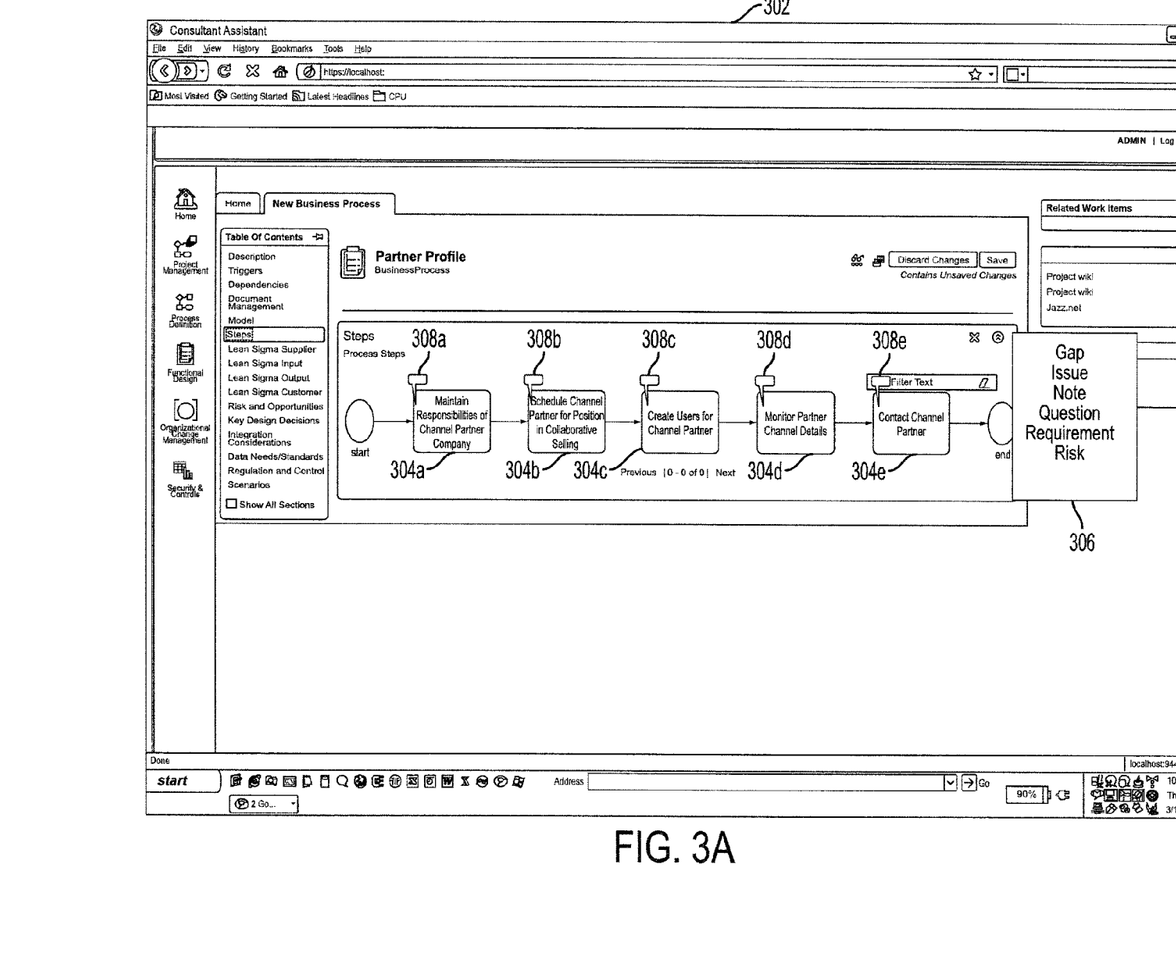
FIGS. 3A and 3B are example screen shots illustrating a tool that enables users to perform interactive blueprinting in one embodiment of the present disclosure.
Figure 3B:
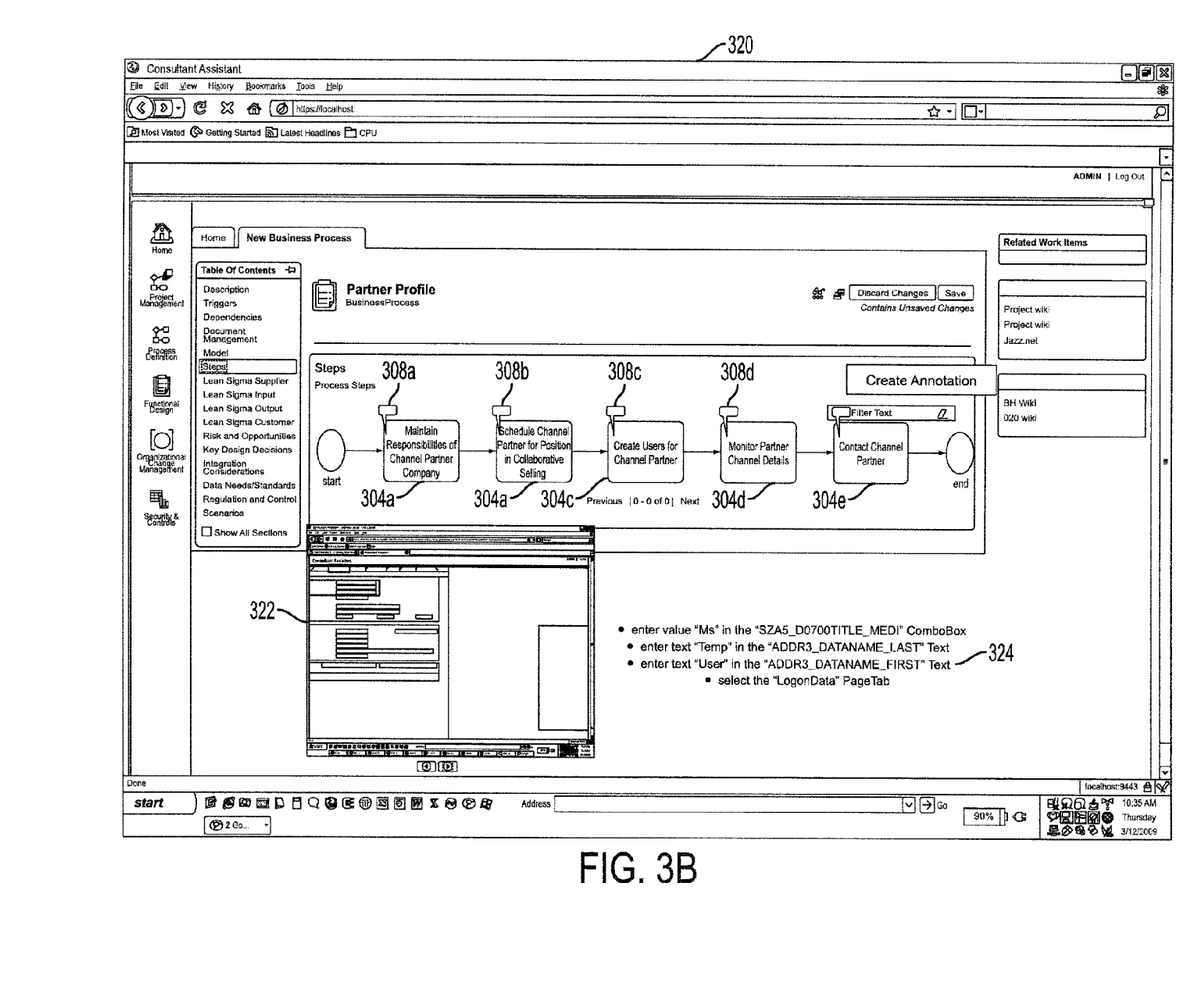

At 106, a process model is generated from the English text. This may be done manually or semi-automatically, for instance, using tools such as Microsoft™ PowerPoint™ and Visio™ IBM's Websphere Business Modeler™, or other tools. Examples of process models rendered graphically are shown in FIGS. 3A and 3B. The boxes between the start and end nodes illustrate the individual steps in a selected operation. Note FIGS. 3A and 3B show the steps for another example operation, not the above example of the human resource hiring operation. Once a process model is generated, it can be imported into a model-based tool such as the IBM Consultant Assistant™ tool. The IBM Consultant Assistant™ tool understands the format of the generated process model. The IBM Consultant Assistant™ tool may render the process model in a GUI, for example, its main panel, and link it with a number of elements in the project work product model.

As shown at 116, low level information may be captured. For instance, each individual involved in the blueprinting may make annotations or notes about the individual sub-processes in the operation. Examples of the low level information captured may include but are not limited to, Gaps, Issues, Notes, Questions, Requirements, and Risks, associated with the elements of the project work product model. To make such annotations or notes for capturing by the tool, for instance, as shown in FIGS. 3A and 3B, the rendered process notation graphics may be selected via the tool's user interface and appropriate notations input on the user interface. As described above, MDA tools such as the IBM Consultant Assistant™ tool have the capability of understanding formats of process models imported from tools like Microsoft PowerPoint™ and Visio™, and IBM's Websphere™ Business Modeler, and linking them to the elements of the work product model. Linking may involve storing the associations in a computer readable and/or executable data structure format. After linking, the IBM Consultant Assistant™ tool user interface may allow the user to click on a particular step in the process model (e.g., FIG. 3A at 304a, . . . , 304e) to select the step, pop-up the context menu (e.g., FIG. 3A at 306), select a menu item out from it (e.g., Gap, Issue, Note, Question, Requirement, Risk), and add annotation (e.g., FIG. 3A at 308a, . . . , 308e) to the step. Then the added annotation may be stored in a database such as the IBM Consultant Assistant™ tool database so that it can be retrieved and shared later through the tool.

At 118, the annotations are then structurally linked to the process objects of the individual components. For instance, as described above, after the process model is generated, an MDA tool such as the IBM Consultant Assistant™ tool may link the process model with the project work product model, and link the steps of the process model with the corresponding elements in the project work product model. The project work product model also already includes the data structure for such low-level information, for example, Gap, Issue, Note, Question, Requirement, Risk, and others associated with the elements of the project work product model. Based on the low-level information data structure of an element in the project work product model corresponding to the selected process step of the process model, the IBM Consultant Assistant™ tool may provide the user interface with the context menu for process steps—for example, Gap, Issue, Note, Question, Requirement, Risk, and others. The user can add annotations of these categories by using the user interface. Thus, the annotations added via the GUI by a user may be captured and stored, linked to the respective element of the project work product model corresponding to the selected process step of the process model.

By linking the information to the work product model, it is possible to display and make editable the information via the model-based work product tools like IBM Consultant Assistant™, which operates on the model-based work product and the associated data instances.

In addition, at 120, information related to the similar process may be queried and retrieved, for example, annotations made in the past to the similar work project operation may be retrieved. The query results may be displayed to the user. The user may browse through the results (annotations from the database associated with process models similar to the current one), and may select one or more of them for use, for example, add them to the current process model as annotation. This step 120 may utilize a query recommend engine 126, which searches the database of previous projects including, for example, database of annotations (FIG. 2, 214) and processes (FIG. 2, 216), and puts together recommendations that might be useful to the user for the current process model. The query recommend engine 126 additionally may use a dictionary (FIG. 2, 210) and ontologies (FIG. 2, 212) to semantically analyze the search results (recommendations) and refine them. The query recommendation engine 126 may employ text analysis, computational linguistics, semantic and syntactic analysis algorithms for recommending annotations from the database of past projects.

The above-describe method allows the users to input annotations, and to view recommendations automatically generated based on similar projects. Based on the annotations and recommendations, the users may make actionable decisions in their blueprinting process in the scope of their project, for example, making changes to their process model based on the annotations and recommendations. Following the blueprinting process, the generic third party software, for example, may be identified and modified in order to customize it for the particular customer operation according to the blueprinting process. Actions may be assigned to persons, i.e., who should perform what actions. For example, a programmer may be assigned to design, add, remove, and modify the work product documents for customization.

Steps 218 and 220 may be repeated as the users go through the steps of blueprinting (designing) their process in the scope of their project, that is, steps of 104, 106, 108, 110, and 112.

At 108, the steps of the business process identified above are compared and matched with the standard business process models of the third party vendor's enterprise software, for example SAP or Oracle packaged application's software component that supports the human resource department hiring operations. This step defines the business process that will be implemented by using the package application software. The customer-specific business process in the particular enterprise as defined in steps 104 and 106 are compared with SAP's (or other packaged application software) standard business processes at 108 to understand where the gaps (differences) are. Because SAP™'s software supports only its standard processes, to fill the gap between the client-specific process and SAP™ standard process, the gap or the differences are identified and special custom code is written to customize the process. This is usually an iterative process, therefore steps 108, 110, and 112 may be repeated multiple times, for instance, until an agreement is reached among the users (designers). Their communication can be captured through the steps and facilities of steps 116, 118 and 120 linked with the process model of interest.

At 110, a business process is demonstrated through process simulation. Business processes have a hierarchy. Business scenarios include one or more business processes, which in turn include one or more business steps or activities. The process simulation can simulate whichever level of process, step or activity the user chooses. Once a project process model is prepared, the method and system of the present disclosure allows the user to simulate the process with a real user interface—either on-line (real-time) 112 or off-line 110. At 110, the user may prepare the simulation off-line by using a simulation tool or the present disclosure. The user may run the process in the real SAP™ instance with mockup data, end-to-end, and capture the screen shots or frames by using a screen cam tools such as IBM™ CoScripter (http://coscripter.researchlabs.ibm.com/coscripter). Then the captured screen frames are linked to the steps in the business process model. In a tool such as the IBM Consultant Assistant™, the captured screens can be replayed by frame by frame, step by step, and shared among the users for further refinement of the business process of the project.

At 112, the process is demonstrated using remote execution. That is, the real third party software application, e.g., SAP™ packaged application, is used to execute the process.

At 114, the work product documents for the work project operation, for example, the hiring operation, are generated according to the blueprinting performed in the previous steps.

Figure 2:
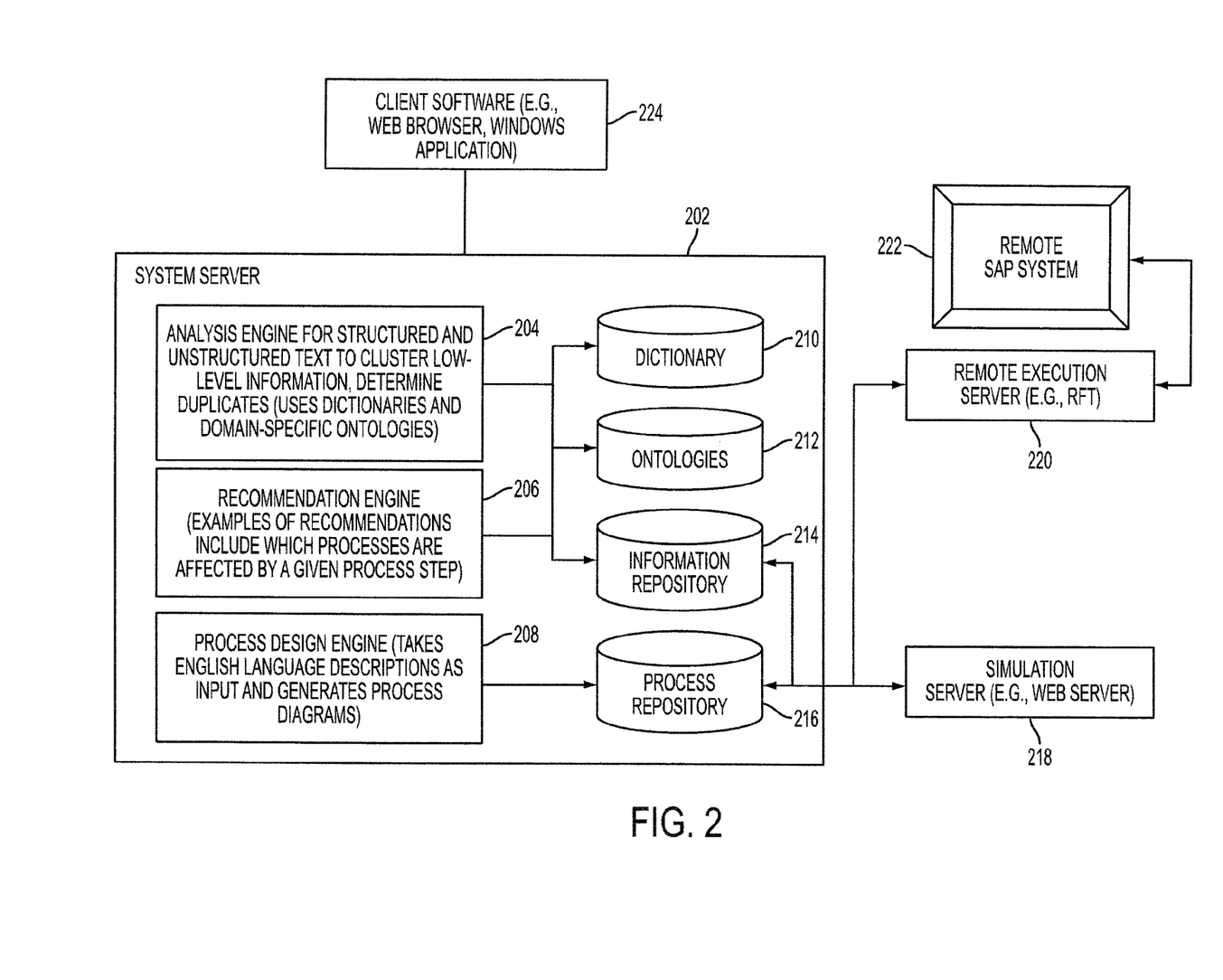
FIG. 2 is an architectural diagram illustrating functional components of an interactive blueprinting system in one embodiment of the present disclosure.

FIG. 2 illustrates functional components of an interactive blueprinting system in one embodiment of the present disclosure. Client software 224 may be a web browser or Window™ application or the like that utilizes computer readable object form of work products, i.e., work product model. The client software 224 may enable users to process (create, edit, store, retrieve, print, etc.) work products such as various documentations used in package applications, e.g., deployment of IT systems. An example user interface screen for the client software 224 may provide in shown in FIG. 3A.

A system server 202 may be a computer system executing computer executable modules including but not limited to an analysis engine 204, recommendation engine 206, and process design engine 208. The system server 202 may also include storage devices that store a database of dictionary 210 and ontologies 212. Briefly, dictionary 210 stores words and their definitions, in computer readable data form. Ontologies 212 store word relationships. Information repository 214 stores information about the processes, for instance, obtained via user input. For instance, the information repository 214 may include information about the previous projects, the low level information or annotations described above captured, and others. A process repository 216 stores processes involved in projects. It stores various business processes, for example, both project specific process and standard processes supported by third party vendor software like SAP™ and Oracle™. They may be in a standard language for business processes, BPMN (Business Process Modeling Notation). Different vendors may also have their own proprietary business process languages. It should be understood that the data repositories such as the dictionary 210, ontologies 212, information repository 214 and process repository 216 may co-reside in the server 202, or they may individually or together be remotely located from the server 202 in different locations.

The analysis engine 204 uses the dictionary 210 and domain-specific ontologies 212 to interpret and analyze the annotation data about each process or step in the work operation being blueprinted entered by the user (e.g., the individuals involved in blueprinting). The analysis engine 204 may identify and manage duplicate information, for example, for efficient storage purpose, analyze and categorize unstructured text annotations.

The recommendation engine 206 also may use the ontologies 212, the dictionary 210 and the information repository 214. For example, the engine 206 may recommend a step in a business process model that can be implemented either by software module A of a third party system, e.g., SAP, or software module B of the system—based on annotations from previous projects, perhaps, a best practice project. Additionally, the engine may recommend that the installation and configuration of software module A may be more cost-effective compared to that of software module B from another source, another previous project. This is useful information for the users to determine and refine their project business process.

Annotations provide a medium through which the users may discuss a step in a process in the blueprinting phase, e.g., to determine how to implement software installation and configuration by using SAP software module(s). Using the annotations, they may discuss specific requirements for the step in the project, what SAP modules provide, what gaps are there, what options they have to resolve the gaps, what risks each option might have, etc. All the discussion is captured in annotations.

The recommendation engine 206 compares the step along with all annotations with the information collected in previous projects including best practice(s) 214 and 216, e.g., by using text search techniques which understand both syntax and semantics of text by using dictionaries 210 and ontologies 212. The recommendation engine 206 receives search results, and ranks them by a certain set of criteria. There also can be many embodiments possible for the ranking mechanism. For example, relevance based on subject matter expert feedback may be ranked as the biggest factor. Also, machine learning techniques can be applied to 206 to make the recommendation engine 206 smarter every time it gets feedback from a subject matter expert (SME), for instance, for providing more accurate recommendations.

The process design engine 208 takes the plain natural language (e.g., English) description of processes involved in the work operation and generates process diagrams, storing the process diagram in computer readable data form in the process repository 216. The generated process diagram may be displayed or otherwise presented via the client software 224, e.g., as shown in FIG. 3A. For instance, the engine may include natural language processing capabilities, and recognize actors, actions, and the sequence of actions from the plain English description. Then it may transform the description into a process model. This transformation may be semi-automatic, for instance, with human working on the initial machine-translated version and refining it into a process model.

Users may then select the process from the diagram and input additional notations (also referred to as annotations) to the process. The input is accepted by the client software 224 and may be processed by the analysis engine 204 and stored in the information repository 214.

Simulation server 218 may be a computer server, e.g., a web server which may include as simulation engine component or module that simulates an entire script or execution of instruction by instruction. For example, the simulation server 218 may interact with a simulation graphical user interface (GUI) component of the client software 224 via which the user may describe the process design by building a list instructions. Each instruction describes one interaction between a user and the packaged application instance. Each script step corresponds to a user interaction in the customized packaged application software tool (e.g., customized SAP™), which implements the defined project business process that is simulated according to the method and system of the present disclosure. A script step corresponds to one or more screen shot frames of the SAP™ tool. A business process step can be simulated by one or more script steps—including user input (text input, button clicks, etc.) and the interface view change as result of the user input. For each instruction, the simulation GUI sends the instruction to a simulation engine of the simulation server 218. The simulation engine at the simulation server 218 parses the instruction, extracts the required information, e.g., action="click", object="button", label="OK"). Examples of the script steps are shown in FIG. 3B at 324. Also, [Replay] [Backward] [Forward] buttons are shown below the simulation view interface 322. They are used to make the simulation engine execute the script steps and update the display on the simulation view interface accordingly. The user may also click through the script steps one by one, and the simulation view display may be updated accordingly.

The simulation engine builds an internal representation of the action that can be executed on a packaged application engine, for instance, a screen capture of the user interface when the step is taken in the packaged application software. The simulation engine provides capabilities to edit the screen captures so that one can add, delete and modify the captured screens to simulate a process.

For each software implementation for process step, there may be gap between what the client wants (requirements) and what SAP™ software provides. Also there will be multiple options to resolve a gap by customizing the SAP™ software module(s). Before the users (designers) determine which gap resolution option they will take, they need to understand what risks there will be for each gap resolution option. Simulation in the blueprinting phase helps in this respect. Simulation creates mockup implementation (e.g., focusing on user interface and without full functionality implemented) of each gap resolution option, and shows how it works out to help their design decision. Script or instructions provide ways to manipulate the mockup creation of different options in the simulation tool like IBM CoScripter™.

For instance, the users may create one or more mockup scenario simulations, each simulation representing one or more gap resolution options, by running parts of SAP™ software through the simulation tool (e.g., IBM CoScripter™ or IBM Rational Functional Tester (RFT)™). One or more scripts are generated by the simulation tool. The users may modify and combine one or more scripts in the simulation tool to create one or more additional simulations of one or more gap resolution options. The users may review, compare and analyze the gap resolution options by replaying the created simulations in the simulation tool to understand the risks of each option and determine the implementation approach (e.g., gap resolution method) for the project.

Figure 4:
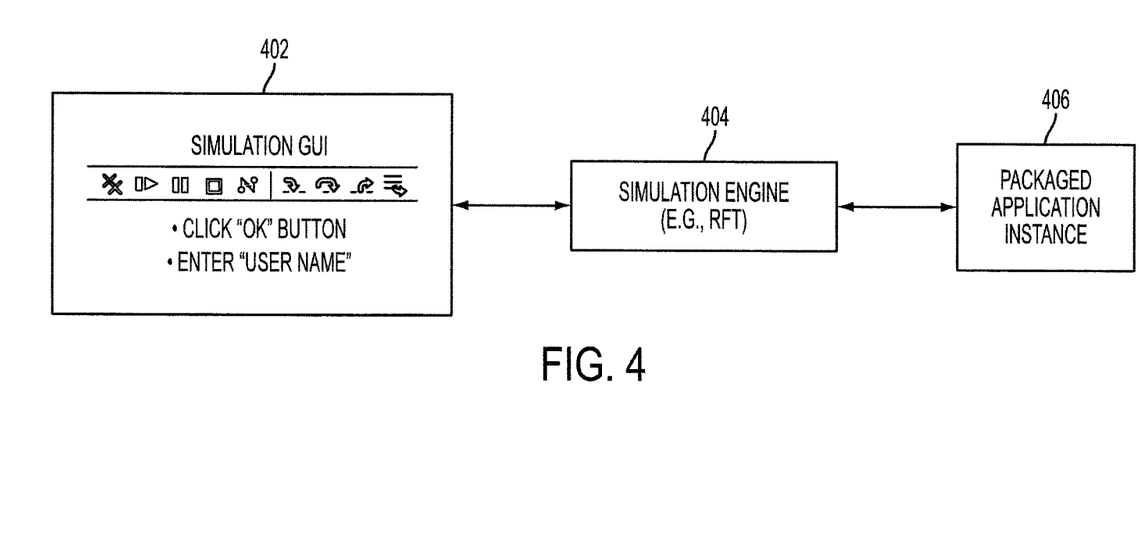
FIG. 4 shows a simulation graphical user interface (GUI) and simulation engine.

The simulation GUI and engine are shown in FIG. 4. A simulation GUI 402 may be integrated with the client software 124 (e.g., IBM Consultant Assistant™) and communicate with the simulation engine 404, which may be implemented in the simulation server 218. The client software 124 may present interaction mechanisms such as [Replay] [Backward] [Forward] buttons as shown in 402 to the user. Examples of the simulation server 218 may include IBM Rational Functional Tester (RFT), and IBM CoScripter, but not limited to only those two. The communication between the simulation GUI 402 and the simulation engine 404 may be through any wired or wireless communication techniques, including but not limited to the Internet, local area network (LAN), wide are network (WAN), and others. Packaged application instance is a real (not-simulated) software that can be run on the third party platform (e.g., SAP or Oracle.

The simulation server 218 thus enables simulating a third party software that supports a particular step in the process and which is customized to meet the customer's specific configurations, without actually executing on the third party software platform and before being launched on the third party software platform.

Referring to FIG. 2, remote execution server 220 remotely executes the remote third party packaged application system such as the SAP™ system 122, for instance, once the user is satisfied that the blueprinted process steps, for instance, simulated via the simulation server 218 meet the user's needs.

FIG. 3A illustrates a screen shot 302 of user interface software that is run on the client software (FIG. 2, 224) for allowing users (e.g., the individuals working on blueprinting a work project) to communicate with another via annotating the process or sub steps (e.g., 304a, 304b, 304c, 304d, 304e) involved in the work project. In this way low-level information such as concerns, ideas, comments, questions, suggestions (e.g., that were traditionally communicated via in emails, chats, phone calls, or verbal communication), about the process or sub steps may be documented and saved and stored electronically. Information may be entered by invoking a pop up menu 306 and selecting one of the subject areas or topics to which the note or annotation is related. Other user interface input techniques may be used. The entered annotation or note is linked with the process the annotation is related to, in an internal computer data representation of the processes and their annotations. For example, this may be done in a database table format or others. The user interface shows a bubble graphics (308a, 308b, 308c, 308d, 308e) or other indication to indicate that a process has related annotation or note.

FIG. 3B illustrates a screen shot 320 of user interface software that is run on the client software (FIG. 2, 224), which shows the simulation screens 322 of the simulation process (FIG. 1, 110).

The system and method of the present disclosure as described above can provides for an interactive and collaborative mechanism that allows user to capture low-level information (e.g., comments, ideas, questions, etc.) during activities such as workshops, query low-level information (e.g., offline and/or online), and automatically generate collaboration documents. The system and method may also provide recommendations based on existing information (from current and past engagements), and enhance the design environment with interactive, real-time simulation and testing of the simulated implementation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts, or combinations of special purpose hardware and computer instructions.

Figure 5:
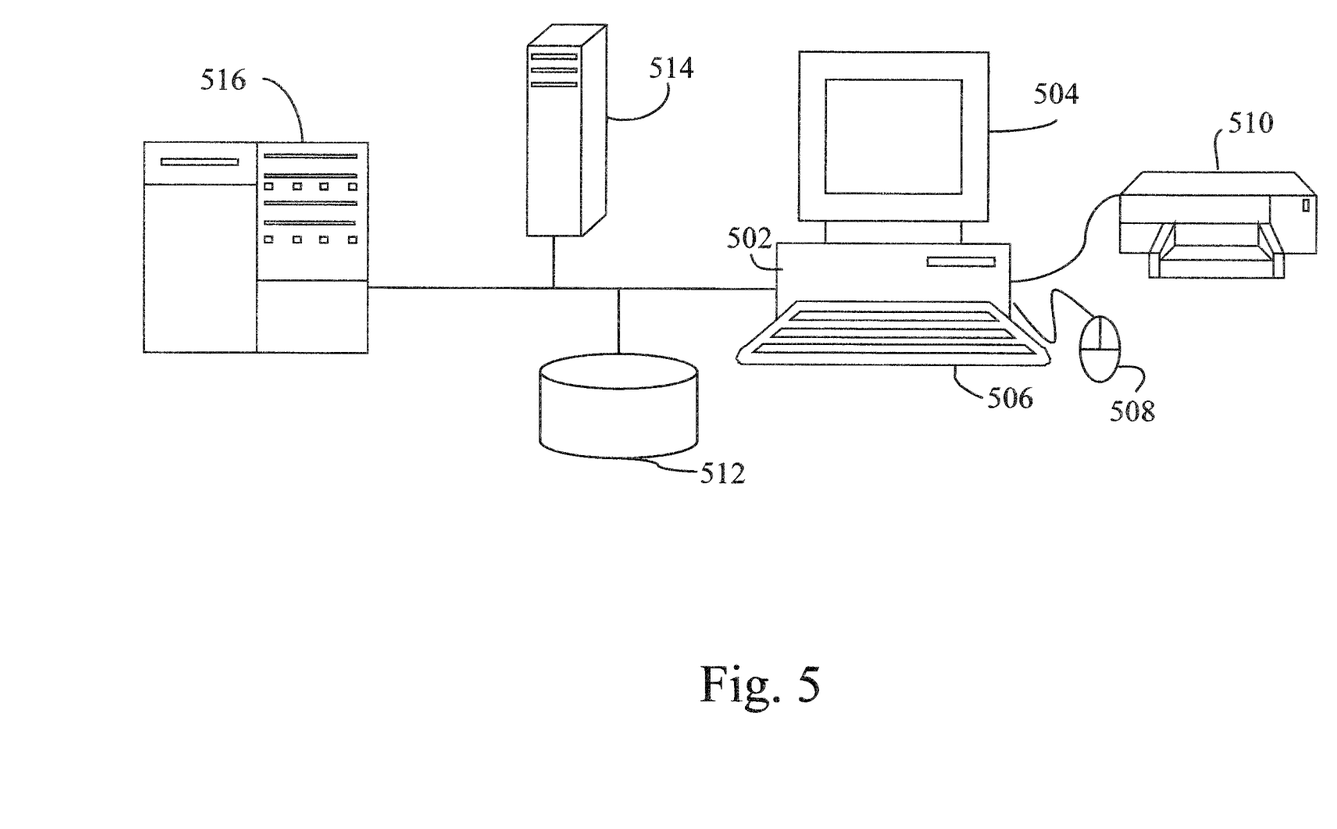
FIG. 5 illustrates an example of a computer system, in which the systems and methodologies of the present disclosure may be carried out or executed.

Referring now to FIG. 5, the systems and methodologies of the present disclosure may be carried out or executed in a computer system 502 that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 504 for presenting output displays and providing a display through which the user may input data and interact with the processing system, for instance, in cooperation with input devices such as the keyboard 506 and mouse device 508 or pointing device. The computer processing system may be also connected or coupled to one or more peripheral devices such as the printer 510, scanner (not shown), speaker, and any other devices, directly or via remote connections. The computer processing system may be connected or coupled to one or more other processing systems such as a server 510, other remote computer processing system 514, network storage devices 512, via any one or more of a local Ethernet, WAN connection, Internet, etc, or via any other networking methodologies that connect different computing systems and allow them to communicate with one another. The various functionalities and modules of the systems and methods of the present disclosure may be implemented or carried out distributedly on different processing systems (e.g., 502, 514, 516), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for interactive design of process model for software installation and configuration, comprising:

generating a process model from a natural language description of software installation or configuration related operation;

identifying a data structure representing one or more work products related to the process model, the work products comprising at least documentations associated with deployment of IT systems;

identifying one or more elements of the data structure related to one or more sub-processes of the process model;

capturing input information associated with said one or more sub-processes;

storing the input information and linking, by a processor, the stored input information with said one or more elements of the data structure that correspond to said one or more sub-processes;

displaying a simulation of said one or more sub-processes in the process model, wherein the simulation uses the stored input information;

graphically displaying the process model including the one or more sub-processes via a graphical user interface, wherein the step of capturing including allowing a user to select a sub-process for inputting information for the selected sub-process;

displaying an annotation symbol associated with the displayed sub-process, if the displayed sub-process has associated input information captured and stored previously; and allowing the user to select the annotation symbol to retrieve and display the associated input information.

2. The method of claim 1, wherein the step of displaying includes:
    creating one or more simulation screens based on one or more resolution options determined from the input information; and
    generating one or more scripts that describe operation steps in the one or more simulation screens.

3. The method of claim 1, further including:
    storing the one or more sub-processes in the process model as a computer readable object.

4. The method of claim 1, wherein the step of capturing input information includes:
    providing a user interface for capturing the input information, the user interface prompting for input information including items identified as one or more attributes of the one or more elements of the data structure that describe the sub-process whose input information is being captured.

5. The method of claim 1, wherein the input information includes one or more of gap, risk, requirement, note, question, or issue associated with the sub-process whose input information is being captured.

6. The method of claim 1, further including:
    searching for other information associated with one or more past projects having a sub-process related to the displayed sub-process and displaying said other information with the associated input information.

7. A computer readable storage medium, excluding signal per se, storing a program of instructions executable by a machine to perform a method for interactive design of process model for software installation and configuration, comprising:
    generating a process model from a natural language description of software installation or configuration related operation;
    identifying a data structure representing one or more work products related to the process model, the work products comprising at least documentations associated with deployment of IT systems;
    identifying one or more elements of the data structure related to one or more sub-processes of the process model;
    capturing input information associated with said one or more sub-processes;
    storing the input information and linking, by a processor, the stored input information with said one or more elements of the data structure that correspond to said one or more sub-processes;
    displaying a simulation of said one or more sub-processes in the process model, wherein the simulation uses the stored input information,
    graphically displaying the process model including the one or more sub-processes via a graphical user interface, wherein the step of capturing including allowing a user to select a sub-process for inputting information for the selected sub-process;
    displaying an annotation symbol associated with the displayed sub-process, if the displayed sub-process has associated input information captured and stored previously; and
    allowing the user to select the annotation symbol to retrieve and display the associated input information.

8. The computer readable storage medium of claim 7, wherein the step of demonstrating includes:
    creating one or more simulation screens based on one or more resolution options determined from the input information; and
    generating one or more scripts that describe the operation steps in the one or more simulation screens.

9. The computer readable storage medium of claim 7, further including:
    storing the one or more sub-processes in the process model as a computer readable object.

10. The computer readable storage medium of claim 7, wherein the step of capturing input information includes:
    providing a user interface for capturing the input information, the user interface prompting for input information including items identified as one or more attributes of the one or more elements of the data structure that describe the sub-process whose input information is being captured.

11. The computer readable storage medium of claim 7, wherein the input information includes one or more of gap, risk, requirement, note, question, or issue associated with the sub-process whose input information is being captured.

12. The computer readable storage medium of claim 7, further including:
    searching for other information associated with one or more past projects having a sub-process related to the displayed sub-process and displaying said other information with the associated input information.

13. A system for interactive design of process model for packaged application software installation and configuration, comprising:
    a processor;
    a process design engine operable to execute on the processor and further operable to generate one or more process models from natural language description of a software installation or configuration related operation, the process model including one or more sub-processes of the software installation or configuration related operation, and store the process model in a process repository;
    a user interface module operable to display the process model including one or more sub-processes of the process model diagram, the user interface module further operable to enable a user to annotate the one or more sub-processes with information;
    an analysis engine operable to analyze information annotated via the user interface and store the information in an information repository, the information being linked to one or more elements of a data structure, the data structure representing one or more work products related to the process model, and the one or more elements corresponding to the one or more sub-processes, the work products comprising at least documentations associated with deployment of IT systems; and
    a simulation server operable to simulate one or more processes in the process model,
    wherein the user interface module is further operable to display an annotation symbol associated with the displayed sub-process, if the displayed sub-process has associated input information captured and stored previously, the user interface module further operable to allow the user to select the annotation symbol to retrieve and display the associated input information.

14. The system of claim 13, further including:
a recommendation engine operable to query the information repository and provide additional information related to the one or more sub-processes from similar past projects.

15. The system of claim 14, wherein the simulation server is operable to create mockup screens for simulating one or more sub-processes of the work operation based on analyzing the information and the additional information.

* * * * *